(No Model.)
W. STANLEY, Jr.
AUTOMATIC REGULATOR FOR ELECTRIC MOTORS.
No. 366,267. Patented July 12, 1887.
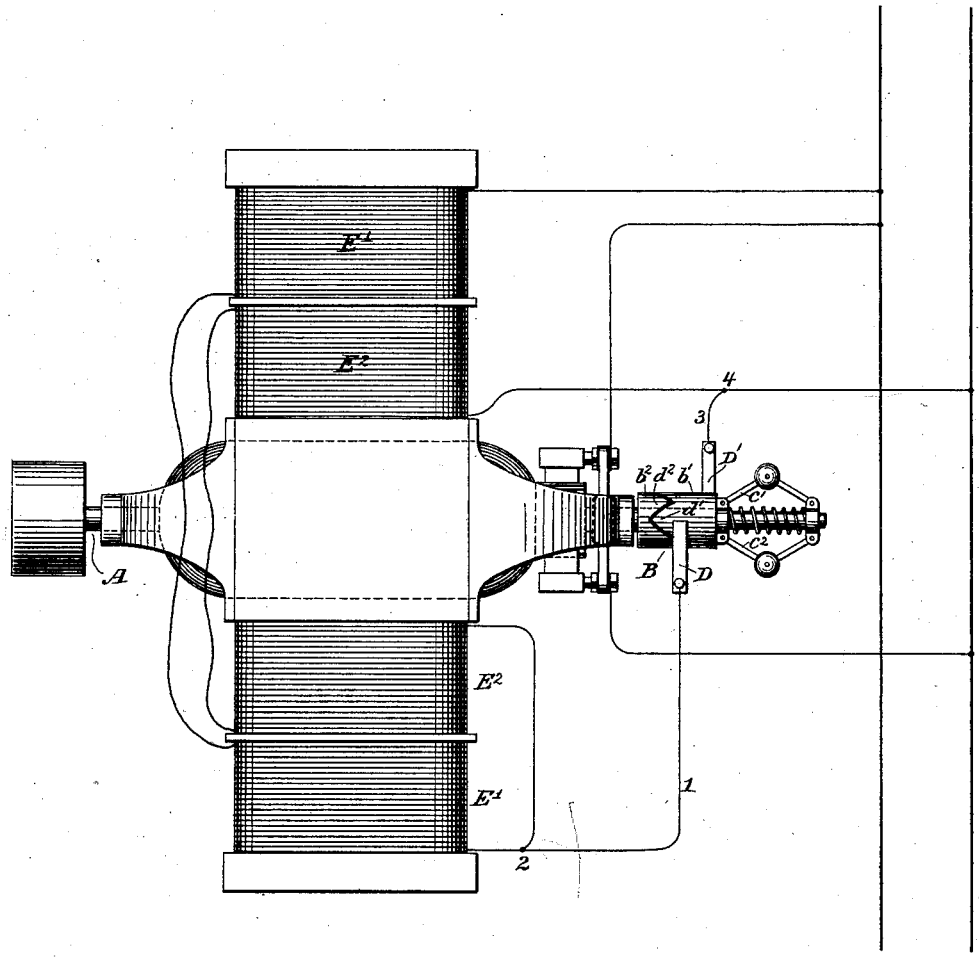
Witnesses
Geo. W. Breck
Carrie E. Ashley
Inventor
William Stanley, Jr.
By his Attorneys
Pope & Edgecomb

UNITED STATES PATENT OFFICE.

WILLIAM STANLEY, JR., OF GREAT BARRINGTON, MASSACHUSETTS, ASSIGNOR TO GEORGE WESTINGHOUSE, JR., OF PITTSBURG, PENNSYLVANIA.

AUTOMATIC REGULATOR FOR ELECTRIC MOTORS.

SPECIFICATION forming part of Letters Patent No. 366,267, dated July 12, 1887.

Application filed September 4, 1886. Serial No. 212,691. (No model.)

*To all whom it may concern:*

Be it known that I, WILLIAM STANLEY, Jr., a citizen of the United States, residing in Great Barrington, in the county of Berkshire and State of Massachusetts, have invented certain new and useful Improvements in Automatic Regulators for Electric Motors, of which the following is a specification.

The invention relates to the class of apparatus employed for governing the movements of electric motors and rendering the same approximately constant throughout the variations which may occur in the electro-motive force supplied thereto, as well as changes in the load carried by the motor. A motor capable of being run at a constant speed throughout variations in the electro-motive force is adapted to be used in a circuit of higher resistance than it is possible to employ in connection with ordinary electric motors, for variations in the electro-motive force due to the loss of current upon the line by leakage and by work done in other places will be automatically compensated for by the regulator applied to the motor.

The invention consists in applying to the shaft of the motor a commutator or circuit-controller, consisting of a series of pointed teeth or plates, to which there is applied a brush, either one of which is capable of being moved laterally with reference to the other, so that the brush will make contact with the narrow or wider portions of the teeth, accordingly as it is desired to increase or decrease the speed of the motor. The circuit-controller is designed to control the completions of short-circuit connections around a regulating-coil applied to the motor, the duration and frequency of which are dependent upon the position of the brush with reference to the plates and the rate of revolution of the motor. The commutator itself is preferably laterally movable along the motor-shaft by means of an automatic governor of any suitable character. The effect of short-circuiting the regulating-coils will be either to lessen the field of force or to increase it, accordingly as the regulating-coils are assisting or opposing coils, and the motor may be constructed according to either plan. Preferably they are opposing coils. Decreasing the field of force will occasion an increase in the rate of revolution, while increasing the strength of the field of force will decrease the rate of revolution.

In another application of even date herewith there is described an organization of apparatus somewhat resembling this in certain particulars.

In the accompanying drawing there is illustrated a motor equipped with an apparatus adapted to carry out the invention.

Referring to the figure, A represents the motor-shaft, and upon this shaft there is carried a movable circuit-controller, B. The position of this circuit-controller is designed to be varied by variations in the rate of revolution of the motor-shaft. For this purpose two arms, $c'$ and $c^2$, of any suitable form of governor C, are fastened at one end to the circuit-controller and at the other end to the shaft in a manner well understood.

The circuit-controller is constructed in two parts, $b'$ and $b^2$, and consists of a series of pointed teeth, $d'$, which preferably alternate with a similar series, $d^2$. These two series are insulated from each other. The series $d'$ is the only portion of the circuit-controller used as a conducting medium, the series $d^2$ being employed only to form a bearing-surface for the brush D applied thereto.

The motor is constructed with two coils, $E'$ and $E^2$, the former of which is employed for maintaining the field, while the latter constitutes a neutralizing or regulating coil, and is for this purpose wound in the opposite direction. The conductor 1 leads from a brush, D, applied to the portion $b'$ of the circuit-controller, to a point, 2, at one end of the regulator-coil $E^2$. A conductor, 3, leads from the contact-brush $D'$ to a point, 4, at the opposite terminal of the regulator-coil. By means of this brush and the commutator-teeth $d'$ the regulator-coil is shunted when the brush rests upon the teeth $d'$ of the section $b'$. When the commutator-brush D rests entirely upon the portion $b^2$, then the current is compelled to traverse the opposing regulator-coils as well as the field-coils. Between these two points the brush will make successive contacts with the teeth of the sections $b'$ and $b^2$, and upon each contact with the former the short circuit will be formed around the regulator-coil, while at other times the current will be caused to traverse the regulating-coils $E^2$. The number of contacts thus made with the section $b'$, and the duration of the same, will determine the strength of the field of force of the motor. When the motor is at rest, the brush rests entirely upon the section $b^2$ and the regulator-coils are in circuit. If a current be then sent through its coils, the brush will be gradually moved toward the section $b'$. Should the speed become too great, the brush will be moved still farther toward the section $b'$ and make contact with the teeth $d'$ of the section $b'$, and thereby complete short-circuit connections around the opposing coils $E^2$, and thus cause the field strength to increase. This will cause the speed of the motor to decrease, and then the brush D will be adjusted to the proper point to maintain the desired rate of revolution. When, on the other hand, the speed of the motor is decreased by increasing the load, for instance, or for any other reason, then the circuit-controller will be moved in the opposite direction—that is to say, toward the section $b^2$, thereby giving the opposing coils $E^2$ more effect, and thereby the field strength will be diminished and the rate of revolution increased.

I claim as my invention—

1. The combination, with an electric motor, of a regulator-coil applied to the field-magnet thereof, means for short-circuiting said coil through variable periods of time during each revolution of the motor-armature, and a governor responding to variations in the speed of the motor for determining the duration of said periods.

2. The combination, substantially as hereinbefore set forth, with the armature of an electric motor, of a regulator-coil applied to the field-magnets of the same, a circuit-controller upon the shaft of said motor, a brush applied thereto, said controller and brush being respectively connected with the opposite terminals of said regulator-coil, and means for modifying positions of the two with reference to each other.

3. The combination, substantially as hereinbefore set forth, with an electric motor, of a circuit-closer consisting of a conducting-surface, having narrowing teeth extending in directions parallel with the axis of revolution of the motor, a contact-brush applied thereto, and means for modifying the position of said circuit-closer and brush with reference to each other by variations in the rate of revolution of the motor.

4. The combination, with an electric motor and its shaft, of a circuit-controlling device, B, having the sections $b'$ with narrowing teeth $d'$, the governor C, for changing the position of said circuit-controller, and the contact-brush applied thereto.

5. The combination, with an electric motor, of means for varying the field strength of the same, consisting of an opposing coil applied thereto and a short-circuiting device for said opposing coil, means for causing the same to complete the connections of a short circuit around the regulating-coils for variable periods, and means for modifying such periods by variations in the rate of revolution of the motor.

In testimony whereof I have hereunto subscribed my name this 5th day of June, A. D. 1886.

WILLIAM STANLEY, JR.

Witnesses:
GEO. H. KIMBER,
REQUARD BELFIELD.